FIGURE I

United States Patent Office 3,513,232
Patented May 19, 1970

3,513,232
ANTIBIOTIC SL 2052
Hans-Peter Sigg, Binningen, Christian Stoll, Basel, and Zoltan Kis, Binningen, Switzerland, assignors to Sandoz Ltd. (also known as Sandoz A.G.), Basel, Switzerland
Continuation-in-part of application Ser. No. 598,088, Nov. 30, 1966. This application Nov. 30, 1967, Ser. No. 686,959
Claims priority, application Switzerland, Dec. 6, 1965, 16,790/65
Int. Cl. A61k *21/00*
U.S. Cl. 424—122         1 Claim

ABSTRACT OF THE DISCLOSURE

A new antibiotic SL 2052 is provided. It is prepared by cultivating a new strain of the fungus species *Myrothecium roridum* Tode ex Fries. The antibiotic has fungistatic activity and is used as a disinfectant by, e.g. dusting a mixture of the antibiotic with inert, solid carriers onto a substrate contaminated with fungi.

---

Figure 1:
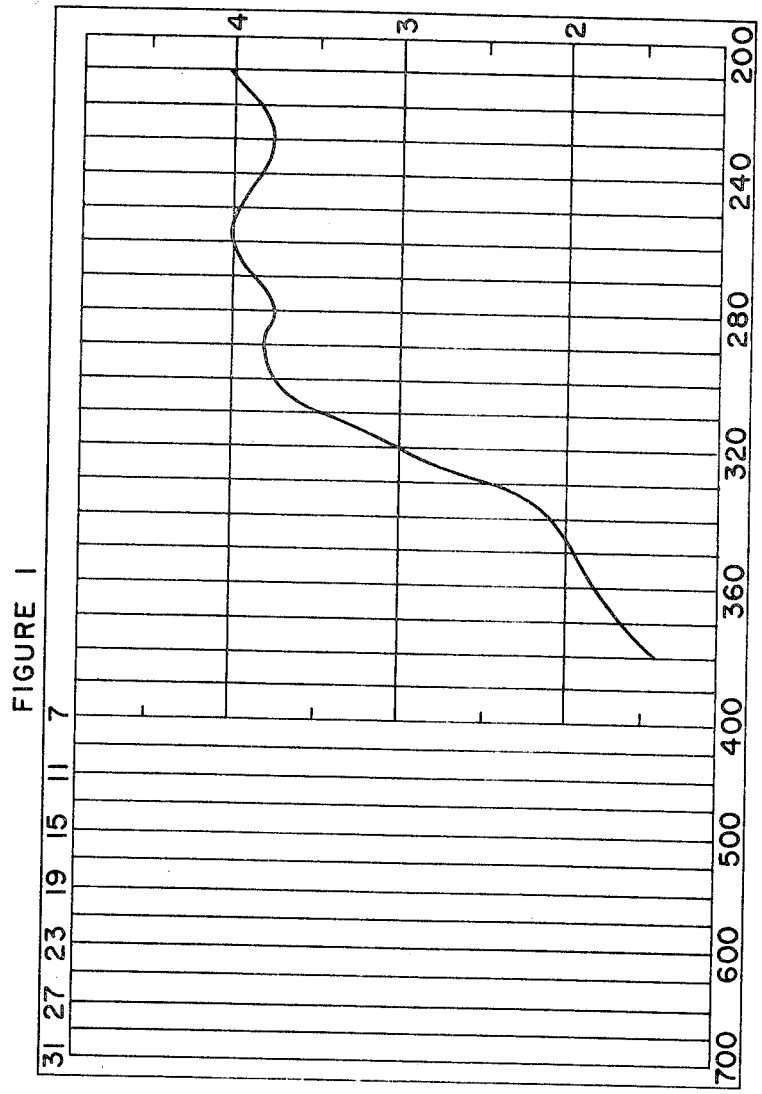

This is a continuation in part of our application Ser. No. 598,088 filed Nov. 30, 1966, now abandoned. The invention relates to a new antibiotic and a process for its production.

The present invention provides a new antibiotic, hereinafter named SL 2052.

The present invention further provides a process for the production of SL 2052, characterized in that a new strain of the fungus species *Myrothecium roridum* Tode ex Fries is cultivated in a nutrient solution and the said antibiotic is isolated from the culture medium in manner known per se, e.g. by extraction or adsorption, and purified.

The new strain of the fungus species *Myrothecium roridum* Tode ex Fries used in accordance with the invention was isolated from an araucaria forest soil sample from Bulolo (New Guinea) and a specimen of this strain has been deposited with the United States Department of Agriculture (Northern Utilization Research and Development Division), Peoria, Ill., U.S.A., under the reference NRRL 3195.

The new strain corresponds morphologically to the description of the fungus species given by N. C. Preston, Trans. Brit. My. Soc. 26, page 158, 1943 and J. C. Gilman, A Manual of Soil Fungi, The Iowa State University Press, page 397. The genus Myrothecium Tode ex Fries belongs to the Fungi imperfecti, order of the Moniliales and Tuberculariaceae family.

The fungus strain NRRL 3195 of the fungus species *Myrothecium roridum* grows at 27° C. on malt-yeast extract agar with a white, loose aerial mycelium. The initially green-coloured, shield-shaped sporophores acquire a black colouration as the ripening process progresses and flow together in slimy spore masses. The fungus stem shows a yellowish posterior side and develops a soluble light yellow pigment.

The sporophores constitute upright, septalized and branched conidia supports, having slightly claviform phialides which form a hymenium-like layer. The cylindrical, light olive-green conidia, rounded at both ends, are formed on these phialides. They usually contain two oil drops and measure 6.5–9.5 x 1.7–2.6$\mu$.

It is also possible to produce the antibiotic SL 2052 using other strains which may be obtained from the above mentioned strain of *Myrothecium roridum* Tode ex Fries, for example by selection or mutation by ultraviolet or X-ray irradiation or other measures, for example by treatment of laboratory cultures with suitable chemicals.

The new strain of *Myrothecium roridum* Tode ex Fries may be cultivated on various nutrient media containing the usual nutrients. Suitable nutrients for this fungus strain are, for example, nutrients normally used for carbon-heterotrophic organisms; specific examples of the carbon source are glucose, starch, dextrin, lactose and cane sugar; organic or inorganic nitrogen containing compounds may be used as the nitrogen source, specific examples being peptone, yeast and meat extracts, ammonium sulphate, ammonium nitrate and amino acids; the usual mineral salts and trace elements are also suitable for use in the nutrient.

One method of producing the antibiotic SL 2052 consists in that a liquid nutrient medium is inoculated with conidia or mycelia of the new strain of *Myrothecium roridum*. The cultivation may, for example, be effected under aerobic conditions in static surface culture or in submerged culture while shaking or in fermenters while aerating with air or oxygen while stirring. The incubation temperature may be 20° to 35° C. However, it is preferred to use a temperature between 25° and 30° C. and a pH value of 5 to 7, in which case the culture is incubated for 4 to 10 days. The new antibiotic is isolated, preferably by extracting the culture filtrate with ethyl acetate, but other solvents, e.g. benzine, benzene, butyl acetate, chloroform or butanol, may likewise be used. The solvent is subsequently removed from the extracts, e.g. by distillation, and the desired antibiotic is isolated by chromatographic purification of the residue on adsorbing agents, e.g. activated alumina, silica gel, magnesium silicate, or by counter current distribution.

The antibiotic SL 2052 has the following characteristics:

SL 2052 is a colourless, crystalline neutral compound having the formula $C_{23}H_{24}O_8$, a melting point of 2347–238° C. and a specific rotation of $[\alpha]_D^{20} = +84°$ (c.=0.54 in chloroform).

Ultraviolet spectrum: maxima at 256 m$\mu$ (log $\epsilon$=4.01) and 291.5 m$\mu$ (log $\epsilon$=3.82) shoulder at 360 m$\mu$ (log $\epsilon$=1.86) (in ethanol) (FIG. 1).

Figure 2:
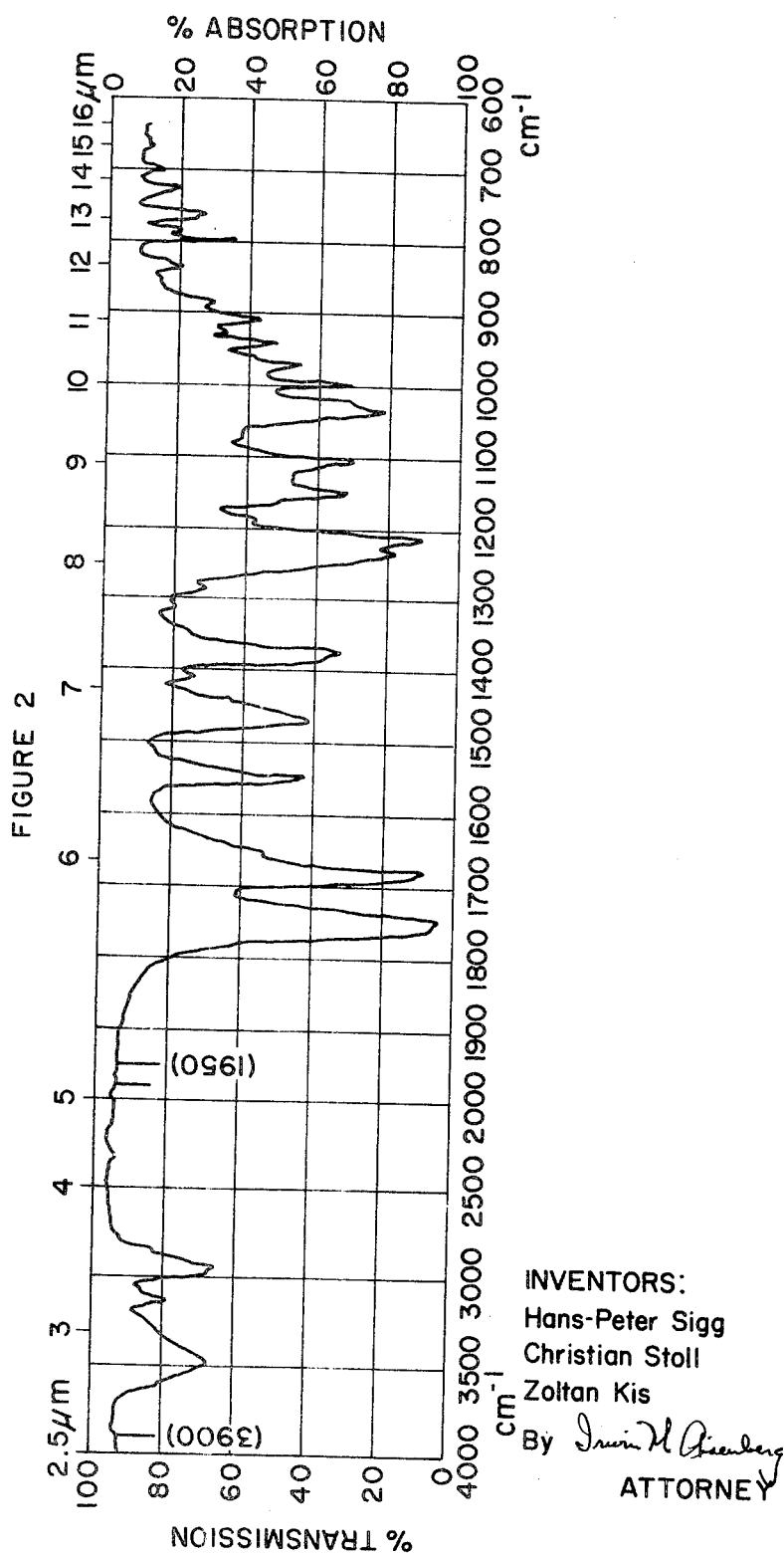

Infrared spectrum: inter alia bands at 3150, 2955, 2950, 1755 shoulder, 1745, 1680, 1545, 1470, 1380, 1230, 1210, 1145, 1105, 1030, 995, 970, 940, 905, 835, 795, 760, 725, 700 cm.$^{-1}$ (1 mg./300 mg. KBr) (FIG. 2).

The antibiotic SL 2052 is a disinfectant which has a very high fungistatic effect towards various fungus infection producing fungi. The antibiotic has a specially pronounced activity towards various yeasts which produce Candidiasis. The antibiotic SL 2052 has a specially strong action against fungi producing dermatomycosis (dermatophytes). It also shows a good activity towards the fungi producing endomycosis (blastomycosis, aspergillosis). In view of the fungistatic activity of SL 2052, it is readily applied to sites where the indicated fungi are found. One part of the antibiotic is, for example, dissolved in 2 parts of "Tween 80" (Sorbitan mono-oleate polyoxyalkylene derivative) and 1 part of dimethyl sulfoxide, and the solution produced diluted with water, to give a concentration of antibiotic of 0.1 to 5%, for use as wash water for scrubbing walls or floors. Preferably, however, it is dusted on a substrate contaminated with any of the indicated fungi. For this purpose it is mixed with an inert, solid carrier, e.g. starch or talc, to give a concentration of the antibiotic of 1 to 5%.

In the agar diffusion hole test inhibition area diameters of at least 20 mm. (hole diameter 7 mm.) were ascertained using the following amounts of antibiotic:

| Organism: | Strain No. | Necessary amount of antibiotic dissolved in 0.1 ml. of 5% methanol (μg.) |
| --- | --- | --- |
| Candida albicans | S 1254 | 4 |
| Candida tropicalis | S 1256 | 1 |
| Microsporum gypseum | S 2418 | 50 |
| Trichophyton mentagrophytes | S 1284 | 20 |
| Trichophyton tonsurans | S 3108 | 20 |
| Trichophyton yaoundei | S 3110 | 30 |
| Cryptococcus neoformans | S 1258 | 30 |
| Blastomyces dermatidis | S 1252 | 30 |
| Blastomyces brasiliensis | S 1251 | 30 |
| Aspergillus fumigatus | S 133 | 30 |
| Paecilomyces varioti | S 1996 | 10 |

TEST METHOD 20 ml. of a sterilized nutrient medium having a temperature of 45°, containing 2% of malt extract (Schweiz. Ferment AG, Basel), 0.75% of Ionagar No. 2 (Oxoid Div. of Oxo Ltd., London SE. 1) and demineralized water are poured into sterile Petri dishes. After the basic layer has solidified, 5 ml. of a sterilized germinating layer consisting of the same medium as the basic layer, to which a spore suspension of $10^6$ of spores of the test fungus has been added after cooling to 40° C., is placed on the basic layer. Holes having a diameter of 7 mm. are punched into the solidified agar plates under sterile conditions and, after removing the punched agar piece, the test samples are transferred to pipettes in portions of 0.10 ml. The test plates are subsequently incubated at 27–37° C. in an incubator for 1–4 days until the fungi show an abundant growth.

The average diameters of the inhibition areas (areas without growth) of several parallel tests are measured.

Antibiotic SL 2052 does not show a detrimental effect on the increase of bacteria or on the increase of animal tissue cultures so that its specific effect against fungi is more pronounced.

The acute toxicity of SL 2052 in white mice amounts to a DL–50 of 18 mg./kg. i.p. or a DL–50 of 5 mg./kg. per os.

The term "in manner known per se" as used herein designates methods in use or described in the literature on the subject.

In the following non-limitative example all temperatures are indicated in degrees centigrade. The melting points were determined on a Kofler block.

EXAMPLE 10 litres of a nutrient solution containing:

| | G. |
| --- | --- |
| Glucose | 20 |
| Malt extract (Schweiz. Ferment AG) | 2 |
| Peptone | 2 |
| Bacto yeast extract (Difco) | 2 |
| $KH_2PO_4$ | 2 |
| $MgSO_4 \cdot 7H_2O$ | 2 |
| Demineralized water to make up one litre. | | are inoculated in a fermenter (New Brunswick Co., U.S.A., type FS 314) with a suspension of spores of *Myrothecium roridum*, strain NRRL 3195 and incubated at 27° C. for 96 hours whilst stirring (450 revolutions per minute). The culture solution is filtered and the filtrate having a pH of 4–